United States Patent [19]

Baker et al.

[11] Patent Number: 4,550,525

[45] Date of Patent: Nov. 5, 1985

[54] TAMPER PROOF RODENT BAIT STATION

[75] Inventors: Stanley Z. Baker, Pepper Pike; Bart M. Baker, Richmond Hts.; Benjamin H. Baker, Chesterland, all of Ohio

[73] Assignee: J. T. Eaton & Company, Inc., Twinsburg, Ohio

[21] Appl. No.: 643,037

[22] Filed: Aug. 22, 1984

[51] Int. Cl.⁴ .......................................... A01M 25/00
[52] U.S. Cl. .................................................. 43/131
[58] Field of Search ................................. 43/131, 124

[56] References Cited

U.S. PATENT DOCUMENTS

| | | | |
|---|---|---|---|
| 2,944,364 | 7/1960 | Kelly | 43/131 |
| 2,964,871 | 12/1960 | Hoffman | 43/131 |
| 3,965,609 | 6/1976 | Jordan | 43/131 |
| 4,026,064 | 5/1977 | Baker | 43/131 |
| 4,349,982 | 9/1982 | Sherman | 43/131 |
| 4,400,904 | 8/1983 | Baker | 43/131 |
| 4,453,337 | 6/1984 | Williams | 43/131 |

Primary Examiner—Gene P. Crosby
Attorney, Agent, or Firm—Body, Vickers & Daniels

[57] ABSTRACT

A tamper proof rodent baiting station is provided with a generally triangular shape, and rodent access entrances at two corners are connected via an entrance passageway along a first exterior wall. A central passageway is connecting to and extending from the entrance passageway towards the third corner, rodent bait retention areas are accessible from the central passageway, and rodent inaccessible openings are provided at the third corner, providing an apparent egress for rodents traveling along the central passageway.

17 Claims, 4 Drawing Figures

TAMPER PROOF RODENT BAIT STATION

BACKGROUND OF THE INVENTION

The present invention relates generally to the art of rodent bait containers, and more specifically to a tamperproof rodent baiting station.

A common method of exterminating rodents is to provide a supply of poisoned bait in an area frequented by such rodents. Such poisons are known and highly effective.

Poisons, however, pose a distinct threat to the safety of domesticated animals and/or small children. As poisons are often presented in an appealing edible format, they present an attraction to children and domestic animals. Thus, it is desirable to place the bait in an enclosed baiting station as inaccessible as possible to all but rodents. This goal causes many problems, as desirable, safe devices often prove unattractive to rodents. One particular problem is that rodents prefer not to enter areas without an apparent egress. Accordingly, the rodent should be able to sense an exit to the baiting station along its given path of travel.

A further goal of rodent baiting stations is the prevention of contamination of bait by environmental conditions such as water. Rodents often frequent damp areas and water flow through rodent bait stations positioned in such areas may cause dispersal of the poison or spoilage of the edible bait. As a result, the bait is rendered unattractive to the rodent, or is dispersed to the outside of the station, posing danger to children and domestic animals. Accordingly, a desirable baiting station maintains the bait in an appropriate condition within a confined area to the greatest extent possible.

Another goal in the design of rodent baiting stations is to devise a station which, while attractive to rodents and able to maintain the bait in position and in edible condition, is also unobtrusive and non-obvious in appearance. To this end, baiting stations have been designed to fit inconspicuously into room corners. Such uses are desirable, since room corners are often unused, or concealed, and are thus a favored location for such traps. However, it is difficult to combine the above desired features together in such a corner box due to the geometry of such a box.

As a safe design for children and domestic animals, rodent bait stations sometimes take a maze format in their interior, whereby a rodent must appropriately enter a number of passageways before reaching the bait. Accordingly, a child or larger animal reaching into such a station is protected from the poison by its inability to reach the bait through the entrances of the trap due to the several turns in the path to the bait. However, such mazes must be attractive to rodents, or they will refuse to enter.

The present invention is directed to a tamper proof rodent baiting station which overcomes the referred to problems and provides a safe and effective baiting station for use in providing poisoned bait to rodents.

In accordance with the present invention, there is provided a rodent bait protection box comprising a generally triangularly shaped enclosure having top and bottom walls and enclosure walls extending vertically therebetween. The enclosure walls form corner areas of the triangular box, and rodent access entrances are provided at two of the corners. Rodent bait retention areas are segregated within the enclosure, each having partition walls which, in combination with the enclosure walls, form the corresponding bait retention area. One of the enclosure walls and portions of the partition walls define a rodent entrance passageway accessible from two corners of the box, and other portions of the partition walls are in parallel space relationship and define an internal central passageway therebetween intersecting the entrance passageway and extending toward the third. The partition walls of the rodent bait retention areas are provided with entrances to the retention areas which, preferably, are indirectly accessible from the central passageway. The corner of the box, at the end of the central passageway is preferably provided with an opening or openings which are perceptible to a rodent from the intersection of the entrance passageway and the central passageway but too small for passage of a rodent therethrough. Preferably, the top wall is in the form of a removable cover.

In accordance with another aspect of the present invention, the rodent access entrances are provided with anti-contamination barriers preventing the entry of liquid into the device which might contaminate the bait.

In accordance with yet another aspect of the present invention there are provided bait retaining barriers at the rodent bait retention area entrances, to retain the rodent bait within the retention area.

In accordance with yet another aspect of the present invention, the device is provided with rodent directing means along the first wall extending outwardly therefrom into the entrance passageway, whereby rodents are directed away from the first wall and towards the central passageway leading to the rodent bait retention areas.

In accordance with yet another aspect of the present invention, the second corner of the device is truncated by an exterior wall segment intersecting with the second and third walls, and perpendicular to the central passageway, and the rodent inaccessible openings are located in this wall segment.

In accordance with yet another aspect of the present of the present invention, the second and third walls form a ninety degree angle therebetween to provide for placement of the device in a room corner.

It is therefore a principal object of the present invention to provide a rodent bait protection box with a generally triangular shaped enclosure and passageways leading from exterior rodent entrances in the box to entrances of rodent bait retention area, wherein the passageways are provided with multiple turns preventing a child or animal from reaching the bait in the bait retention areas, and rodent inaccessible opening in otherwise enclosed passageways allowing a rodent to perceive an exit to the passageway and encouraging its entry thereinto.

Another object of the present invention is the provision of a rodent bait protection box of the foregoing character, wherein the triangular shape is suitable for placement with a room corner to provide as unobtrusive an appearance as possible.

Still another object of the present invention is the provision of anti-contamination barriers at the exterior rodent entrance preventing flow of liquid from the environment onto the trap, a rodent bait retention lips across the entrance to the rodent bait retention areas serving the dual purpose of preventing contamination of bait, a retaining the bait within the bait retention area.

BRIEF DESCRIPTION OF THE DRAWINGS

The invention may take physical form in certain parts and arrangement of parts, a preferred embodiment of which will be described in detail in this specification and illustrated in the accompanying drawing which forms a part hereof and wherein.

DETAILED DESCRIPTION OF A PREFERRED EMBODIMENT

Figure 1:
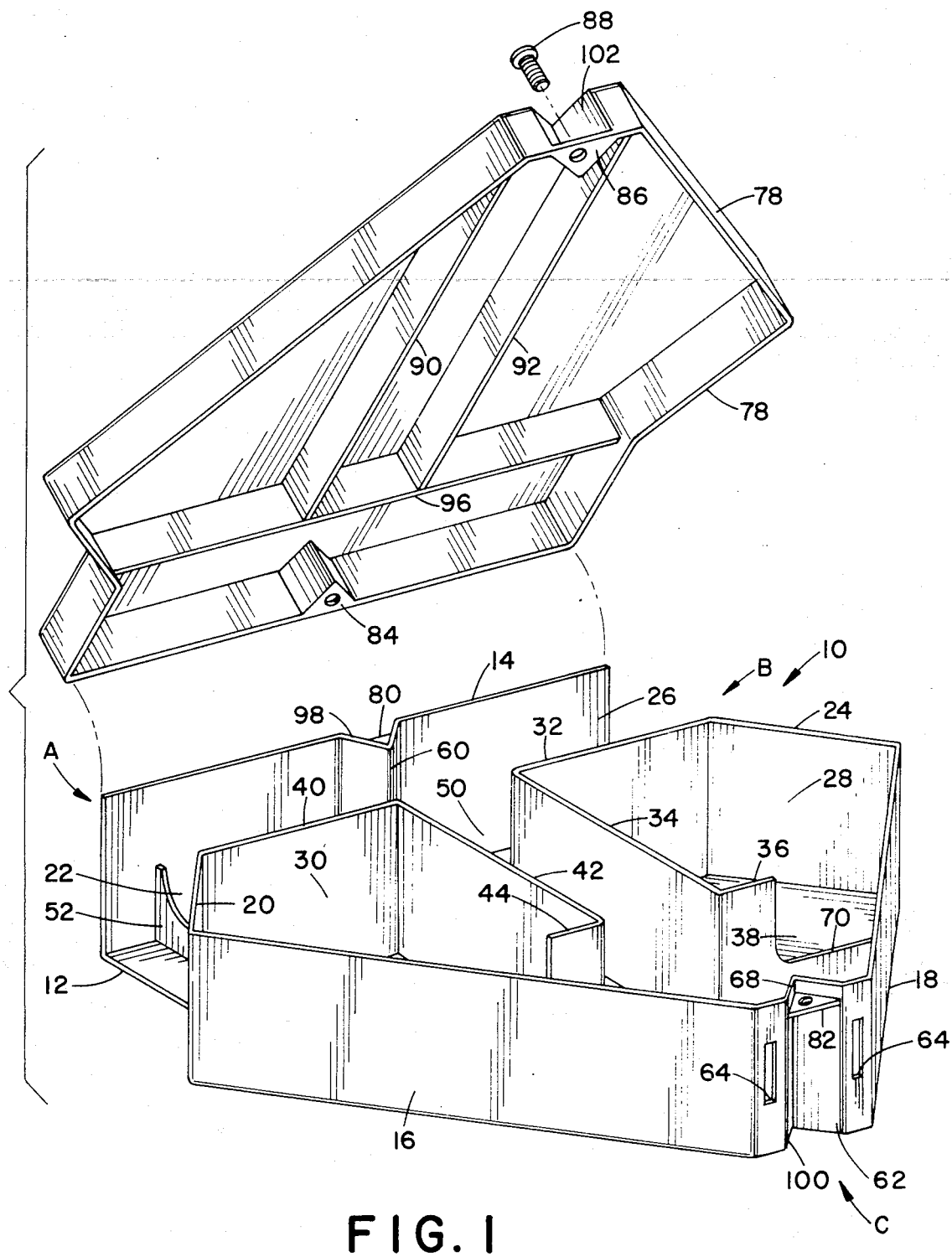
FIG. 1 is a perspective, exploded view of the rodent bait protection box illustrating a preferred embodiment of the present invention.
Figure 2:
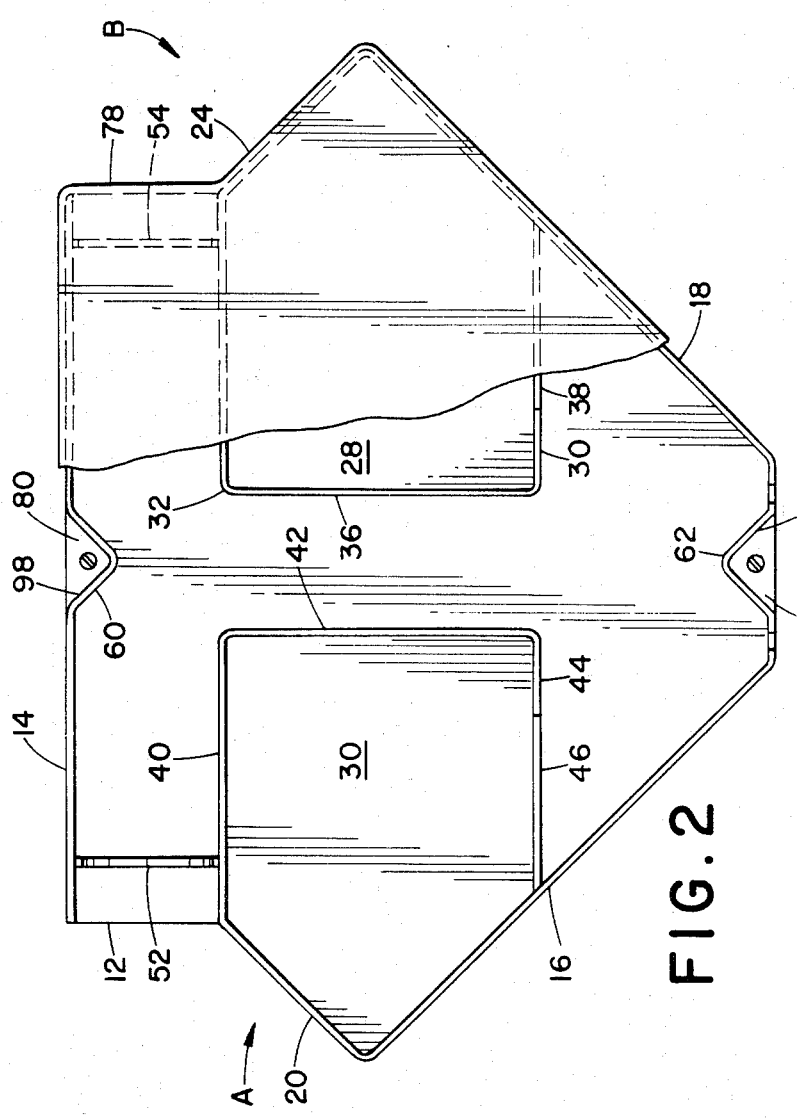
FIG. 2 is a plan view of the rodent bait protection box as shown in FIG. 1, in which a portion of the cover has been sectionally removed to show the interior passageways and bait retention areas of the box.
Figure 3:
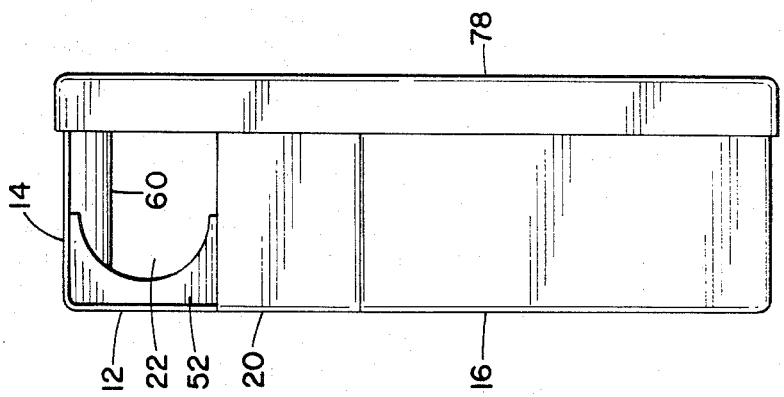
FIG. 3 is a side elevational view of the box looking in the direction from left to right in FIG. 2.

Referring now to the drawings, wherein the showing is for the purpose of illustrating a preferred embodiment of the invention and not for limiting the same, FIG. 1 shows a box 10 having a generally triangular planar cross-section, having corners A, B and C, comprised of a floor 12 and first, second and third enclosure walls 14, 16, 18, all extending upright therefrom.

As shown in FIG. 1, corner A is truncated by providing a wall segment 20, of similar height to the enclosure walls 14, 16, 18, and rodent access opening 22 between the enclosure walls 14 and 16. Likewise, corner B is truncated, with wall segment 24 and rodent access opening 26. Rodent access openings 22 and 26 are located adjacent enclosure wall 14.

The box 10 and associated walls 14, 16, 18 may be of any durable rigid material, and in a preferred embodiment, may be made of rigid plastic, approximately 0.0625 inches thick. The height of the enclosure walls is chosen to be of sufficient size to allow a rodent to pass through the station unimpeded or, in this embodiment, about three inches in height. The length of the enclosure walls is determined by the size of the rodents entering the box, and the need to provide them with areas large enough for them to freely pass. In this embodiment, enclosure wall 14 is about 12 inches in length, and enclosure walls 16 and 18 are each about 10 inches in length.

Within the box 10, rodent bait retention areas 28 and 30 are provided as locations for holding a poisoned rodent bait (not shown). The rodent bait retention area 28 is bounded by enclosure wall 18, wall segment 24, and partition walls 32, 34, and 36. The partition walls are of the same height and formed of the same material as the enclosure walls 14, 16 and 18, and are located within the box 10. Partition wall 36 is provided with a bait retention area opening 38, thereby providing access to the bait retention area from the exterior of that area. In like manner, rodent bait retention area 30 is bounded by enclosure wall 16, wall segment 20, and partition walls 40, 42 and 44. Partition wall 44 is provided with bait retention area opening 46.

Partition walls 32 and 40 are located in parallel spaced relationship with enclosure wall 14. The combination of partition walls 32 and 40, and enclosure wall 14, define an entrance passageway 50 which extends along a generally straight path between access openings 22 and 26, thereby allowing each opening to be perceivable by the rodent from the other. Just inside the access openings 22 and 26, in the entrance passageway 50, are anti-contamination barriers 52 and 54. These barriers, made from the same material as the walls of the box, extend upwardly from the floor 12, and between partition walls 32 and 40 to enclosure wall 14 to form a lip preventing the flow of liquid from entering the station. The barriers 52 and 54 extend upwardly from the floor to a height which prevents a maximum amount of liquid flow through the station, while allowing rodents to pass by the barriers.

Partition walls 34 and 42 perpendicularly intersect partition walls 32 and 40, respectively, and extend from partition walls 32 and 40 generally towards corner C. Partition walls 34 and 42 are in parallel spaced relationship, defining between them central passageway 56, extending perpendicularly from the entrance passageway towards corner C.

At the intersection of the entrance passageway 50 and central passageway 56, a rodent directing arrangement is provided which, in the present embodiment, is comprised of outcropping 60, extending partially into entrance passageway 50 from enclosure wall 14 and extending from floor 12 to the top of wall 14. The outcropping 60 is a wedge-shaped cross-section extension of the wall which urges rodents following the entrance passageway 50 along the enclosure wall to be directed towards central passageway 56.

In accordance with the preferred embodiment, corner C is truncated by wall segment 62. Wall segment 62 approximately corresponds in width to the central passageway 56, and is arranged between enclosure walls 16 and 18, generally perpendicular to the path of rodent travel along central passageway 56. Wall segment 62 is provided with rodent inaccessible openings. In a preferred embodiment, these openings are vertical slots 64 in the wall segment 62, extending from a point in the wall segment above the floor 12 to prevent water contamination through the slots, towards the upper edge of the wall segment. The slots serve to encourage the rodent to enter the otherwise enclosed central passageway 56 and travel towards the corner C of the box 10, proximate to the poison bait retention area openings 38 and 46. It will be appreciated that many other arrangements may be used to convince a rodent that there is an egress at the end of the enclosed central passageway 56, other than slot openings. For example, grid work patterns cut in the plastic, screening, variously shaped holes, transparent panels, etc., would be effective to accomplish the same object, namely to provide the illusion to the rodent of an exit, while not allowing the rodent to pass therethrough.

A rodent directing arrangement may also be located on wall segment 62 between the slot openings, such as is provided by outcropping 68. The outcropping 68 may be in the form of a wedge similar in size and construction to outcropping 60 on enclosure wall 14. Thus, as the rodent begins to feel it way along the wall segment 62, it is urged towards the poisoned bait retention area openings 38 and 46, respectively.

Bait retention area openings 46 and 38 are provided in partition walls 44 and 36 and adjacent the enclosure walls 16 and 18 respectively. Thus, as the rodent follows either of the enclosure walls 16 and 18 after confronting the outcropping 64, it follows the wall directly into the bait retention area to consume the bait.

The retention area openings are provided with lips 70 and 72. The lips 70 and 72 serve the dual purpose of protecting against contamination from exterior water flow and retaining the bait within the retention area.

Box 10 includes a top wall which, in the preferred embodiment, is provided by a removable cover 76. Cover 76 is provided with edge 78, which corresponds to the perimeter of the box, overlapping the walls to provide a waterproof enclosure. The cover is preferably secured via tabs 80 and 82 on the enclosure walls, complimentary tabs 84 and 86 on the cover, and threaded fasteners 88. The cover is also provided with cover support members 90, 92 and 96 which laterally overlie the partition walls 34, 42, 32 and 40 to provide strength and support for the cover to prevent its breaking and collapse into the box.

Figure 4:
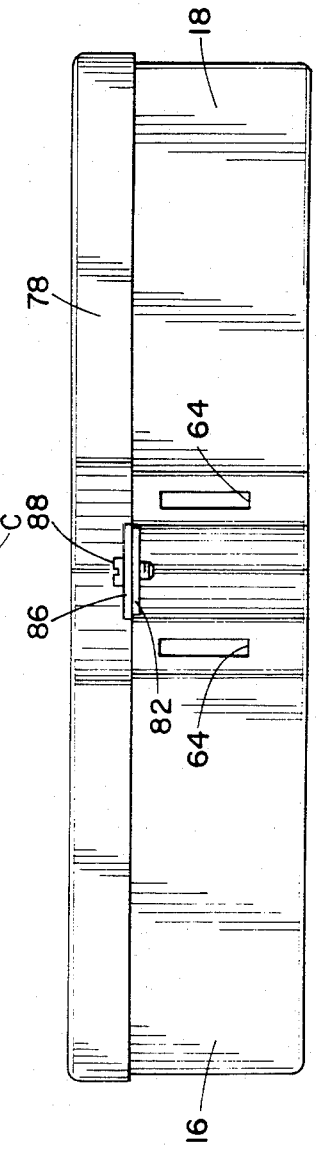
FIG. 4 is an end elevational view of the box looking in the direction from bottom to top in FIG. 2.

In the preferred embodiment, wall segment 62 and enclosure wall 14 are molded to provide the wedge-shaped rodent directing outcroppings 60 and 68, thereby providing wedge-shaped recesses 98 and 100 on the exterior of the box. Tabs 80 and 82 may be inset in these recesses to provide a flush fir and to obviate the need for protruding tabs, which may break away. The cover 76 is also molded for tabs 84 and 86 to underlie wedge-shaped recesses such as is shown by mass 102 in FIG. 1. This provides for the complimentary points of tabs to facially engage one another when the cover is in place as is shown in FIG. 4 with regard to tabs 82 and 86.

The entire device is of a shape suitable for placement in a room corner in order to allow for placement of the device as unobtrusively as possible. Accordingly, enclosure walls 16 and 18 form a 90° angle to fit securely in position against unintentional movement which might jar or spill the poison inside the trap.

The arrangement of wall segments 20 ad 24, and rodent access entrances 22 and 26 advantageously positions the openings 22 and 26 across the path of travel of the rodent. Thus, a rodent following a room wall will be encouraged by wall segment 20 or 24 to enter the corresponding opening 22 or 26 which extends across his path of movement.

The invention has been described with reference to the preferred embodiment. Obviously, modifications and alterations will occur to others upon the reading and understanding of this specification. It is my intention to include all such modifications and alterations insofar as they come within the scope of the appended claims or the equivalents thereof.

Having thus described the invention, it is claimed:

1. A rodent bait protection box comprised of:
   a generally triangularly-shaped enclosure having a floor and at least first, second, and third enclosure walls extending vertically upright therefrom, a first corner between said first and second enclosure walls, a second corner between said second and third enclosure walls, and a third corner between said first and third enclosure walls;
   rodent access entrances at each of said first and third corners;
   first and second bait retention areas segregated within said enclosure, each having first, second, and third partition walls in combination with a different one of said second and third enclosure walls to form said bait retention areas;
   said first enclosure wall and each of said first partition walls being in parallel spaced relationship to define an entrance passageway therebetween directed from said first rodent access entrance to said second rodent access entrance;
   said second partition walls being in parallel spaced relationship and defining a central passageway therebetween intersecting said entrance passageway and extending from said entrance passageway toward said second corner;
   said third partition walls of said rodent bait retention areas each having a bait retention area entrance, indirectly accessible from said central passageway;
   said second corner provided with rodent-inaccessible opening means, perceivable from said intersection of said entrance passageway and said central passageway; and
   a removable cover.

2. A device as defined in claim 1, wherein said removable cover is releasably secured to said device.

3. A device as defined in claim 1, and including anti-contamination means at said rodent access entrances.

4. A device as defined in claim 3, wherein said anti-contamination means include a raised lip member across each said rodent access entrance.

5. A device as defined in claim 1 and including bait retaining means at each said rodent bait retention area entrance.

6. A device as defined in claim 5, wherein said bait retaining means includes a raised lip member across said rodent access entrance.

7. A device as defined in claim 1 and including rodent directing means along said first wall and extending outwardly therefrom into said entrance passageway, whereby rodents are directed away from said first wall towards said central passageway.

8. A device as defined in claim 7 wherein said rodent directing means include a wedge-shaped outcropping extending from said first wall partially into said passageway at the intersection of the entrance passageway and said central passageway.

9. A device as defined in claim 1 wherein said second corner includes exterior wall segment means intersecting with said second and third walls and perpendicular to said central passageway, and said rodent inaccessible openings are located in said wall segment means.

10. The device as defined in claim 9 wherein said rodent inaccessible openings comprise a pair of slots in said wall segment means.

11. The device as defined in claim 1 wherein said second and third walls form a 90° angle therein between.

12. A device as defined in claim 11 and including rodent directing means at said wall segment means.

13. The device as defined in claim 12 and wherein said rodent directing means includes an outcropping extending from said wall segment means toward said central passageway whereby rodents are urged along either of said second and third walls.

14. A rodent bait protection box comprised of: a generally triangluarly-shaped enclosure having top and bottom wall means and enclosure wall means extending vertically between said top and bottom wall means and including at least first enclosure wall means;
   first and second segregated rodent bait retention areas within said enclosure and each having at least first and second partition wall means between said top and bottom wall means;
   each of said first partition wall means being parallel to and spaced inwardly from said first enclosure wall means to define rodent entrance passageway means inwardly along said first enclosure wall means;
   said second partition wall means being parallel to and spaced apart from one another to define central passageway means intersecting said entrance passageway and extending from said entrance passageway between said bait retention areas;

said central passageway means having an end spaced from said entrance passageway means and means providing each said first and second bait retention areas with an entrance accessible from said central passageway means.

15. A device as defined in claim 14, wherein said enclosure wall means include second and third enclosure wall means in diverging relation toward said first enclosure wall means and having an end spaced from said end of said central passageway means, and means providing opening means in said end of said second and third enclosure wall means in alignment with said central passageway means.

16. A device according to claim 14, wherein each of said bait retention areas includes third partition wall means extending laterally outwardly from the corresponding second partition wall means at said end of said central passageway means, said third partition wall means providing each said bait retention area with an entrance including an opening through the corresponding arm of said third partition wall means.

17. A device according to claim 14, wherein said top wall means is a removable cover.

* * * * *